United States Patent
Ehrler

(10) Patent No.: US 9,601,986 B2
(45) Date of Patent: Mar. 21, 2017

(54) METHOD AND ARRANGEMENT FOR THE SURGE PROTECTION OF INVERTERS FOR PHOTOVOLTAIC SYSTEMS

(75) Inventor: Jens Ehrler, Neumarkt (DE)

(73) Assignee: DEHN + SÖHNE GmbH + Co. KG, Neumarkt/Opf (DE)

( * ) Notice: Subject to any disclaimer, the term of this patent is extended or adjusted under 35 U.S.C. 154(b) by 306 days.

(21) Appl. No.: 14/342,955

(22) PCT Filed: Aug. 21, 2012

(86) PCT No.: PCT/EP2012/066252
§ 371 (c)(1),
(2), (4) Date: Mar. 11, 2014

(87) PCT Pub. No.: WO2013/034428
PCT Pub. Date: Mar. 14, 2013

(65) Prior Publication Data
US 2014/0211525 A1    Jul. 31, 2014

(30) Foreign Application Priority Data

Sep. 5, 2011 (DE) .......................... 10 2011 112 474

(51) Int. Cl.
*H02H 7/122* (2006.01)
*H02H 3/20* (2006.01)
(Continued)

(52) U.S. Cl.
CPC ............ *H02M 1/32* (2013.01); *H02H 7/1222* (2013.01); *H02H 7/20* (2013.01)

(58) Field of Classification Search
CPC ........ H02M 1/32; H02M 1/322; H02M 1/327; H02M 1/34; H02M 1/36; H02M 2001/325;
(Continued)

(56) References Cited

U.S. PATENT DOCUMENTS

| | | | |
|---|---|---|---|
| 2010/0295377 A1 | 11/2010 | Sok et al. | |
| 2011/0038089 A1* | 2/2011 | Kasper | H01H 71/04 361/115 |
| 2011/0194216 A1* | 8/2011 | Schaub | H02H 7/1222 361/18 |

FOREIGN PATENT DOCUMENTS

| | | |
|---|---|---|
| DE | 4032569 A1 | 4/1992 |
| DE | 19904561 C1 | 8/2000 |

(Continued)

OTHER PUBLICATIONS

Office Action in German dated Nov. 11, 2014, for corresponding German Application No. 102011112474.1.

(Continued)

*Primary Examiner* — Timothy J Dole
*Assistant Examiner* — Carlos Rivera-Perez
(74) *Attorney, Agent, or Firm* — Kinney & Lange, P.A.

(57) ABSTRACT

The invention relates to a method and an arrangement for the surge protection of inverters for photovoltaic systems, comprising at least one surge protection device which is physically integrated in the inverter or can be found in the vicinity of the inverter. The at least one surge protection device is connected to the DC side of the inverter. According to the invention, the inverter supplies a signal for setting or tracking the operating point at an operating level in the maximum power point (MPP) range, the response voltage of the surge protection device being predetermined, set, or selected on the basis of said signal.

9 Claims, 2 Drawing Sheets

(51) Int. Cl.
*H02H 9/04* (2006.01)
*H02M 1/32* (2007.01)
*H02H 7/20* (2006.01)

(58) Field of Classification Search
CPC ........ H02M 2007/4835; H02H 7/1222; H02H
7/20; H02H 7/44; H02H 7/48; H02H
7/53871; H02H 3/20; H02H 3/08; H02J
3/383; G05F 1/67; Y10S 323/906; Y10S
323/908; Y10S 323/901; Y02E 10/50;
Y02E 10/52; Y02E 10/56; Y02E 10/566;
Y02E 10/563; Y02E 10/58
USPC ... 363/15–21.01, 49–51, 55–58, 95–99, 106,
363/109, 131–134; 323/205–211,
323/222–226, 271–278, 282–286, 351,
323/901, 906, 908; 361/18, 88–91.8,
361/93.9, 111, 114, 115, 117–119;
307/77, 80, 82
See application file for complete search history.

(56) References Cited

FOREIGN PATENT DOCUMENTS

| | | |
|---|---|---|
| DE | 102008050543 A1 | 4/2010 |
| EP | 2187510 A1 | 5/2010 |
| WO | 2011023238 A1 | 3/2011 |

OTHER PUBLICATIONS

International Search Report for PCT/EP2012/066252, mailed Dec. 14, 2012.

* cited by examiner

METHOD AND ARRANGEMENT FOR THE SURGE PROTECTION OF INVERTERS FOR PHOTOVOLTAIC SYSTEMS

BACKGROUND

The invention relates to a method and arrangement for the surge protection of inverters for photovoltaic systems, comprising at least one surge protection device which is physically integrated in the inverter or located in the vicinity thereof, wherein the at least one surge protection device is connected to the direct current side of the inverter, according to patent claims 1 and 7.

In typical photovoltaic systems several photovoltaic modules are connected in series to form a photovoltaic string so as to obtain a direct voltage of some 100 to 1000 V, respectively 1500 V, suited for the direct voltage-alternating voltage (DC-AC) conversion and the subsequent feeding into the mains.

The photovoltaic string in question is connected either directly to the inverter, or several strings, the configuration of which is as identical as possible, are connected in parallel and connected to a central inverter.

The construction of photovoltaic energy systems is regulated in DIN VDE 0100-712 (VDE 0100-712). Corresponding systems may comprise one or more sub-generator(s).

Relevant for the safe operation of DC-AC inverters is, among others, a sufficient surge protection for the electronic components of the inverter including the EMC protection circuits located there.

Photovoltaic inverters have a broad MPP (Maximum Power Point) voltage range, e.g. type-dependent between 320 and 800 V, with a maximum direct voltage of 1000 V, respectively a minimum direct voltage of approximately 150 V.

Depending on the respective MPP voltage internal current paths are switched in the inverter. To this end, so-called boost converters or buck converters are used.

It is known from the DE 40 32 569 C2 document to provide each photovoltaic module with an integrated inverter with MPP tracking. Such an MPP tracker regulates the voltage to that value at which the system works at maximum power, i.e. in the MPP range. To this end, the MPP tracker varies the drawn current by a defined amount, calculates the instantaneous power and readjusts the current value to a higher power. By means of a control unit signals are transmitted to a data bus which supplies these data to the power and control part for checking the operational capability of the module.

The DE 199 04 561 C1 document describes a method and a circuit arrangement for the maximum power point control of solar generators. According to the solution described in this document a sensor is provided which is electrically insulated from the solar generator. The current characteristic of the sensor is determined quasi-continuously in a manner known per se. The performance characteristic is then calculated from the current characteristic. A controlled variable for the converter is derived quasi-continuously from the maximum. With regard to such a circuit arrangement it is assumed that the sensor used is a solar module which is of the same type as the solar modules used in the solar generator and that a measurement of the characteristics and a microcomputer for detecting the controlled variable of the controller are switched in between the sensor and the converter control.

If solar generators of this type are connected to inverters subjected to a maximum power point control advantages are obtained with respect to the efficiency of the system as a whole. Different MPP voltage values, i.e. voltage values resulting in the greatest power output, involve difficulties with respect to the necessary surge protection of a corresponding inverter, however, because surge protection devices, e.g. varistors, suppressor diodes or spark gaps, each have a defined response voltage, respectively response voltage range, on account of the construction and action thereof. For instance, if the surge protection is set at a maximum direct voltage of 1000 V the protective function in an MPP voltage range of, for instance, 500 V is only insufficient.

SUMMARY

Based on the foregoing, a further developed method and an associated arrangement is disclosed herein for the surge protection of inverters for photovoltaic systems, comprising at least one surge protection device or a group of surge protection devices which is/are physically integrated in the inverter or located in the immediate vicinity thereof, wherein the at least one surge protection device is connected to the direct current side of the inverter. The surge protection is provided to be equally effective and efficient both in the lower and the upper MPP range without requiring, depending on the case of application, manual adjustments or similar manipulations, meaning the exchange of corresponding surge protection devices.

Accordingly, there is proposed a method and an arrangement for the surge protection of inverters for photovoltaic systems, comprising at least one surge protection device configuration which is physically integrated preferably in the inverter or located in the immediate vicinity thereof. The at least one surge protection device or a group thereof is connected to the direct current side of the inverter, wherein this direct current side is connected to a corresponding string of a photovoltaic system.

According to embodiments of the invention the DC-AC inverter supplies a signal for adjusting or tracking the operating point to an operation in the range of the maximum power point (MPP), wherein the response voltage of the surge protection device is specified, adjusted or selected on the basis of this signal.

The signal used may be a control signal which activates from a plurality of surge protection devices those surge protection devices that yield the currently desired response voltage.

The plurality of surge protection devices may be arranged in the form of a cascade, wherein the activation or selection is accomplished by means of controlling respectively parallel-connected switching devices.

The switching devices may be configured as electromechanical relays or also as semiconductor switches.

In an embodiment of the invention the processor provided in the inverter detects, on the basis of the respective MPP voltage, the respective response voltage of the surge protection devices, which ensures an optimum protection in the corresponding operating condition, wherein hereafter surge protection devices are switched on additionally, are disconnected and/or short-circuited.

In order to provide the selection signal for the response voltage of the surge arrester(s) the MPP tracking signal of the inverter may be used.

In the arrangement for the surge protection of inverters for photovoltaic systems a group of surge protection devices is electrically arranged and interconnected in the inverter to allow an adaptation of the response voltage resulting from the switching state to the MPP voltage.

In one embodiment the group of surge protection devices comprises a predetermined number of varistors, suppressor diodes and/or spark gaps which, by the cascading thereof, can be switched to different response voltages in terms of a programming.

In another embodiment of the invention the group of surge protection devices may comprise a combined disconnecting and short-circuiting device so as to effect a voltage disconnection in the event of excess voltage, in order to prevent the danger of fires or other damages.

The invention will be described in more detail below by means of an embodiment and with reference to the figures.

DETAILED DESCRIPTION

Figure 1:
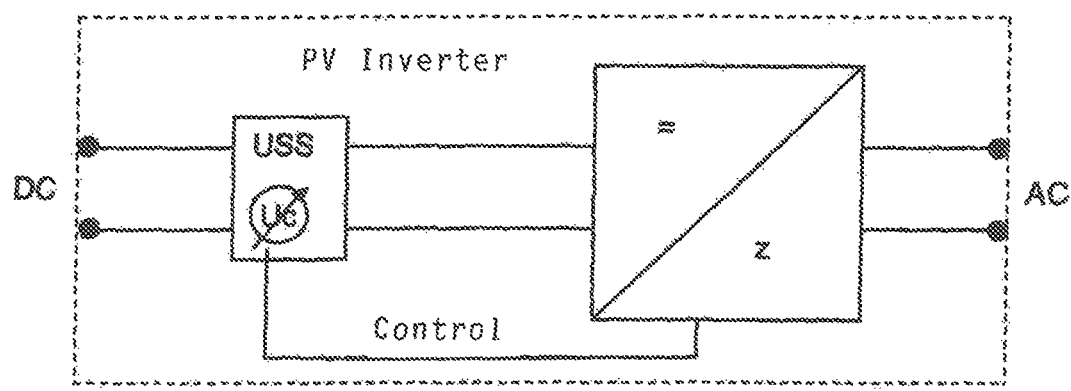
FIG. 1 shows a schematic diagram for explaining the method according to the invention for the surge protection of inverters.

According to the diagram shown in FIG. 1 an input DC on the direct voltage side and an output AC on the alternating voltage side are assumed. The PV inverter according to the invention comprises a DC input part and an AC output part as well as means for the maximum power point control, respectively so-called MPP tracking, so that in spite of different input voltages, e.g. induced by different solar irradiation conditions, a respectively optimum performance of the total system can be ensured.

At the input region on the direct voltage side a surge protection assembly ÜSS is provided to which a control signal is supplied. This control signal may be the signal for adjusting or tracking the operating point to an operation in the maximum power point range. The response voltage of the surge protection device ÜSS is specified, adjusted or selected on the basis of this signal.

Figure 2:
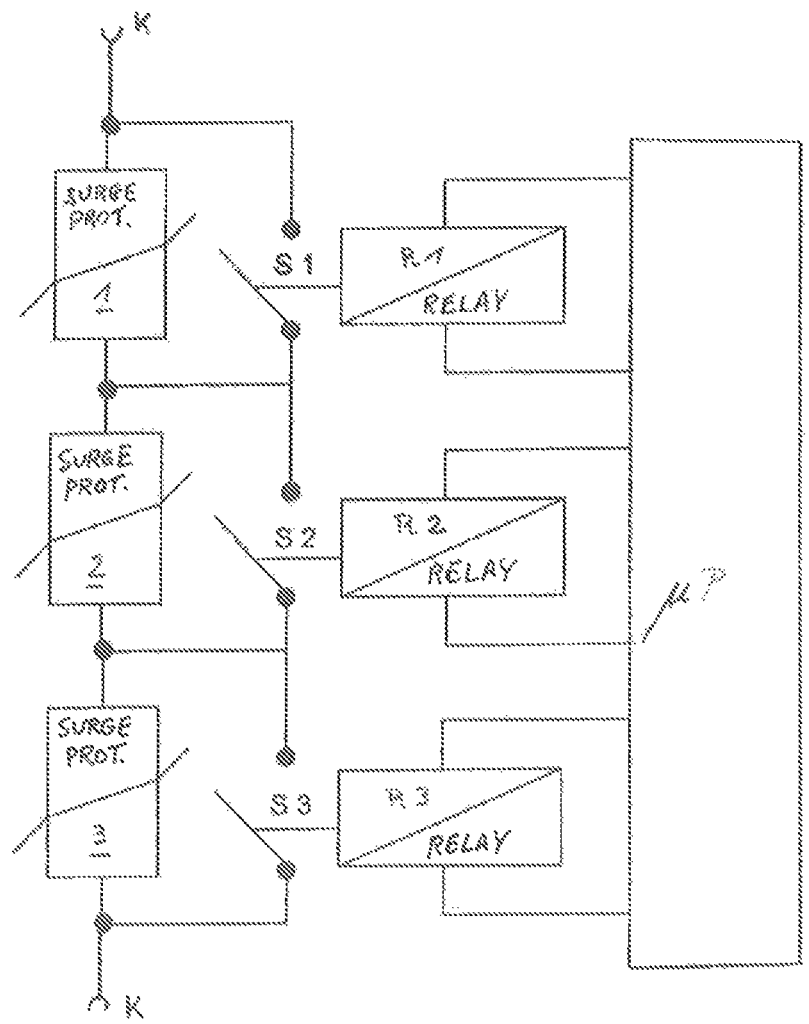
FIG. 2 shows a representation of a possible cascading of surge arresters with parallel-connected switching devices for realizing different response voltages yielded altogether at the external terminals.

A simple control is achieved, for instance, by the cascading of surge protection units 1 to 3, e.g. configured as metal oxide varistors (MOV) with parallel switches S1, S2 and S3, which are respectively controlled by an associated relay R1, R2 and R3 according to the representation shown in FIG. 2.

Depending on the switching state of the switches S1 to S3 a defined response voltage from the partial response voltages of the MOVs 1 to 3 is obtained at terminals K.

The controlling of the relays may be accomplished, for instance, by means of a processor provided in the inverter, which detects the respective response voltage of the surge protection devices on the basis of the respective MPP voltage and hereafter triggers the corresponding switching operations such as short-circuiting, disconnecting or switching in.

The invention claimed is:

1. A system for the surge protection of an inverter for a photovoltaic system, the system comprising:
at least one surge protection device which is physically integrated in the inverter or located in the vicinity thereof, wherein the at least one surge protection device is connected to a direct current side of the inverter,
wherein the inverter supplies a signal for adjusting or tracking an operating point to an operation in the range of a maximum power point (MPP), wherein a response voltage of the surge protection device is specified, adjusted or selected on the basis of this signal.

2. The system according to claim 1, wherein:
the signal is a control signal which activates from a plurality of surge protection devices those surge protection devices that yield the desired response voltage.

3. The system according to claim 2, wherein:
the plurality of surge protection devices are arranged in the form of a cascade, wherein the activation is accomplished by means of controlling respectively parallel-connected switching devices.

4. The system according to claim 3, wherein:
the parallel-connected switching devices are configured as relays or semiconductor switches.

5. The system according to claim 1, wherein:
a processor provided in the inverter detects, on the basis of a respective MPP voltage, the response voltage of the at least one surge protection device, and hereafter additional surge protection devices are switched on additionally, are disconnected and/or short-circuited.

6. The system according to claim 1, wherein:
an MPP tracking signal is used to provide the signal for the response voltage of the at least one surge protection device.

7. Arrangement for the surge protection of an inverter for a photovoltaic system, comprising:
a group of surge protection devices electrically arranged and interconnected to be physically integrated in the inverter or located in the vicinity thereof, wherein the surge protection devices are connected to a direct current side of the inverter, wherein:
the group of surge protection devices are configured to allow an adaptation of a response voltage resulting from a switching state of the surge protection devices to a maximum power point (MPP) voltage, and the inverter supplies a signal for adjusting or tracking an operating point to an operation in the range of the MPP.

8. The arrangement according to claim 7, wherein:
the group of surge protection devices comprises a predetermined number of varistors, suppressor diodes and/or spark gaps which, by the cascading thereof, can be switched to different response voltages.

9. The arrangement according to claim 7, wherein:
the group of surge protection devices comprises a combined disconnecting and short-circuiting device.

* * * * *